No. 786,320. PATENTED APR. 4, 1905.
R. SIEGFRIED.
MEANS FOR RECTIFYING ALTERNATING CURRENTS.
APPLICATION FILED FEB. 12, 1904.
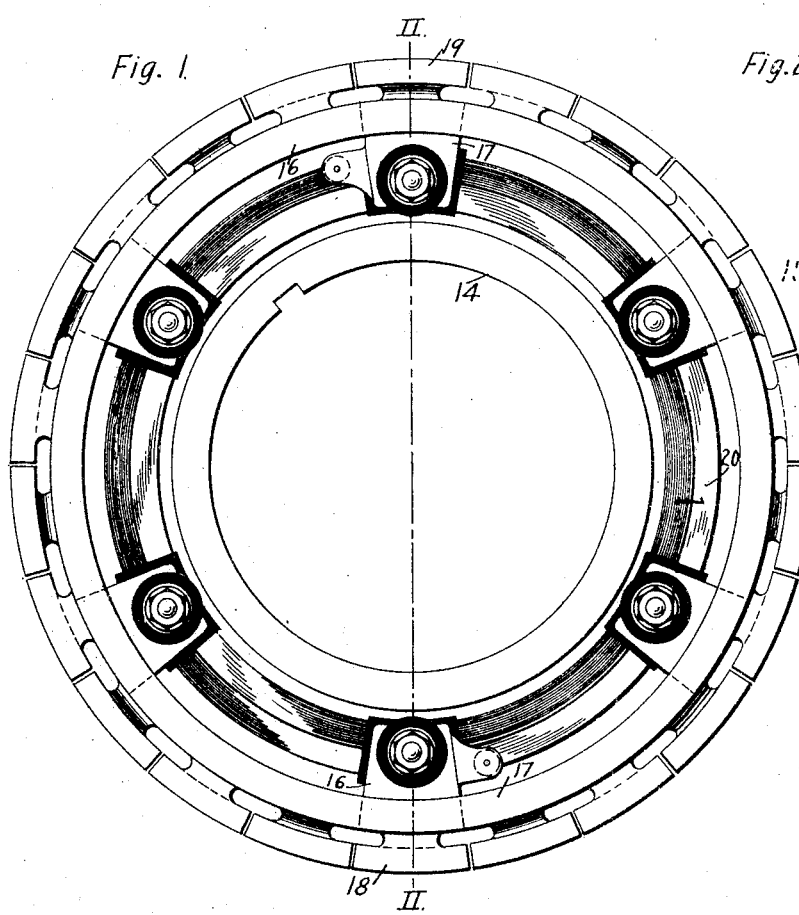
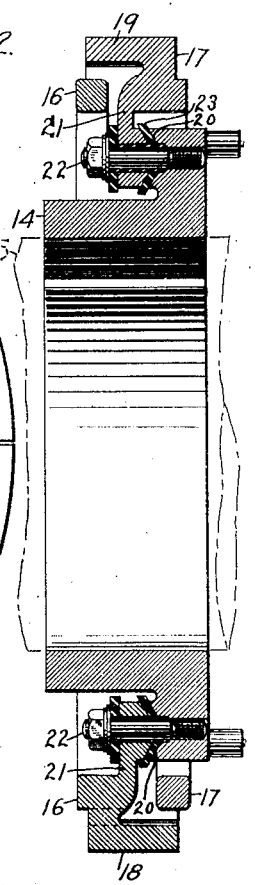
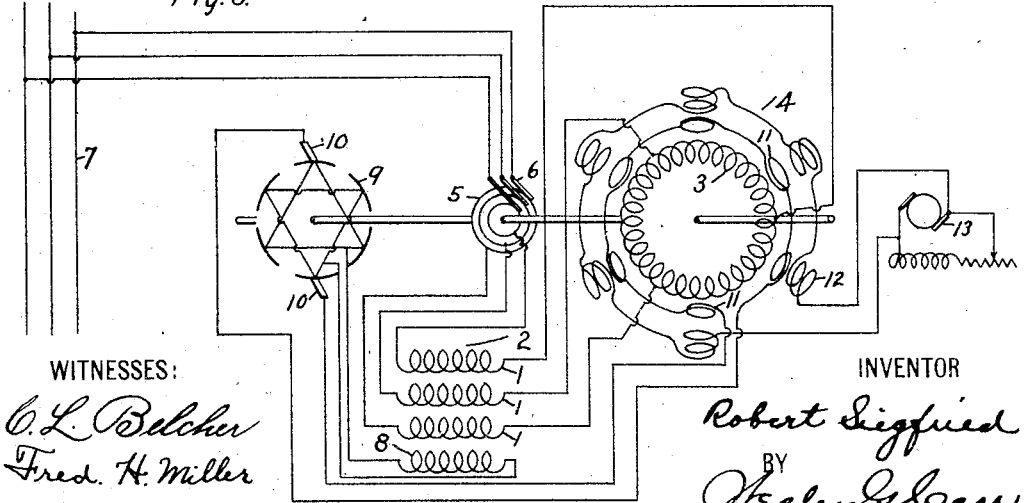
WITNESSES:
C. L. Belcher
Fred. H. Miller
INVENTOR
Robert Siegfried
BY
Wesley G. Carr
ATTORNEYS No. 786,320. Patented April 4, 1905.

UNITED STATES PATENT OFFICE.

ROBERT SIEGFRIED, OF PITTSBURG, PENNSYLVANIA, ASSIGNOR TO WESTINGHOUSE ELECTRIC & MANUFACTURING COMPANY, A CORPORATION OF PENNSYLVANIA.

MEANS FOR RECTIFYING ALTERNATING CURRENTS.

SPECIFICATION forming part of Letters Patent No. 786,320, dated April 4, 1905.

Application filed February 12, 1904. Serial No. 193,357.

*To all whom it may concern:*

Be it known that I, ROBERT SIEGFRIED, a citizen of the United States, and a resident of Pittsburg, in the county of Allegheny and State of Pennsylvania, have invented a new and useful Improvement in Means for Rectifying Alternating Currents, of which the following is a specification.

My invention relates to apparatus for rectifying alternating currents; and it has for its object to provide a rectifier which shall be simple, inexpensive, and durable in construction and efficient in operation.

If the field-magnet of an alternating-current generator is separately excited, the voltage of the circuits supplied by the generator will tend to fall off greatly with increasing current output, and to counteract this tendency an auxiliary field-magnet excitation is frequently provided, which increases with the current output of the machine. For this purpose the whole or a part of the current given out by the machine is rectified and sent through auxiliary field-magnet coils. The rectifier is usually placed on the same shaft which carries the armature and collector-rings and is usually somewhat similar in construction to a commutator, but with alternate bars connected together.

My invention is illustrated in the accompanying drawings, in which—

Figure 1 is an end elevation of a rectifier constructed in accordance therewith. Fig. 2 is a view in section on line II II of Fig. 1; and Fig. 3 is a diagrammatic view of an alternator, showing the electrical connections properly made.

The primary windings 1 of a series transformer 2 are energized by means of alternating currents supplied from the armature-winding 3 of a three-phase alternating-current generator 4. The transformer 2 may be mounted so as to rotate with the armature, and the terminals of the primary windings 1 may be respectively connected to the armature-winding and to collector-rings 5. Brushes 6 serve to collect the currents from the collector-rings 5 and deliver them to line conductors 7. The terminals of a secondary winding 8 of the series transformer 2 are respectively connected to alternate bars of a rectifier 9 by means of cross-connectors, as indicated in Fig. 3. Rectified currents are collected by means of brushes 10 and are utilized to energize an auxiliary field-magnet winding 11 of the alternating-current generator 4, a main field-winding 12 being separately excited from a direct-current generator 13 or any other suitable source.

My invention consists in a rectifier of simple and compact construction, as shown in Figs. 1 and 2, and comprises a spider 14, which is keyed to or otherwise suitably fastened in position upon the armature-shaft 15 and two rings 16 and 17, which are respectively provided with spaced peripheral contact-plates 18 and 19. The spider 14 is provided with a V-shaped annular face 20 and the rings 16 and 17 with radial lugs 21, having convex V-shaped faces adapted to fit into the face 20 of the spider 14, to which they are secured by any suitable means, such as stud-bolts 22, insulating material 23 being interposed between the lugs 21 and the face 20 and also between said lugs and the bolts 22. The peripheral contact-plates of the rings 17 and 18 are of the same width and project, respectively, in opposite directions from the annular portions of the rings, so that the plates of each ring alternate with and occupy the spaces between those of the other ring.

The form and dimensions of the several parts of the rectifier may of course be varied from what is shown without departing from my invention.

I claim as my invention—

1. A commutator for rectifying alternating currents comprising two rings having spaced, peripheral contact-plates which project laterally in opposite directions from the respective rings and inwardly-projecting supporting-lugs.

2. A commutator for rectifying alternating currents comprising two rings having spaced, peripheral contact-plates which project laterally in opposite directions from the respective rings and inwardly-projecting radial lugs, in combination with a spider to which said lugs are bolted.

3. The combination with a shaft and a spider mounted thereon having an annular recess, of rings having inwardly-projecting lugs that are seated in said annular recess and having spaced, peripheral contact-plates which project in opposite directions.

4. The combination with a shaft and a spider having an annular recess in one end, of rings having inwardly-projecting lugs that are clamped into said recess and are insulated therefrom and from each other and each having spaced, peripheral contact-plates which occupy the spaces between the plates of the other ring.

In testimony whereof I have hereunto subscribed my name this 5th day of February, 1904.

ROBERT SIEGFRIED.

Witnesses:
C. A. HEPP,
BIRNEY HINES.